Figure 1:
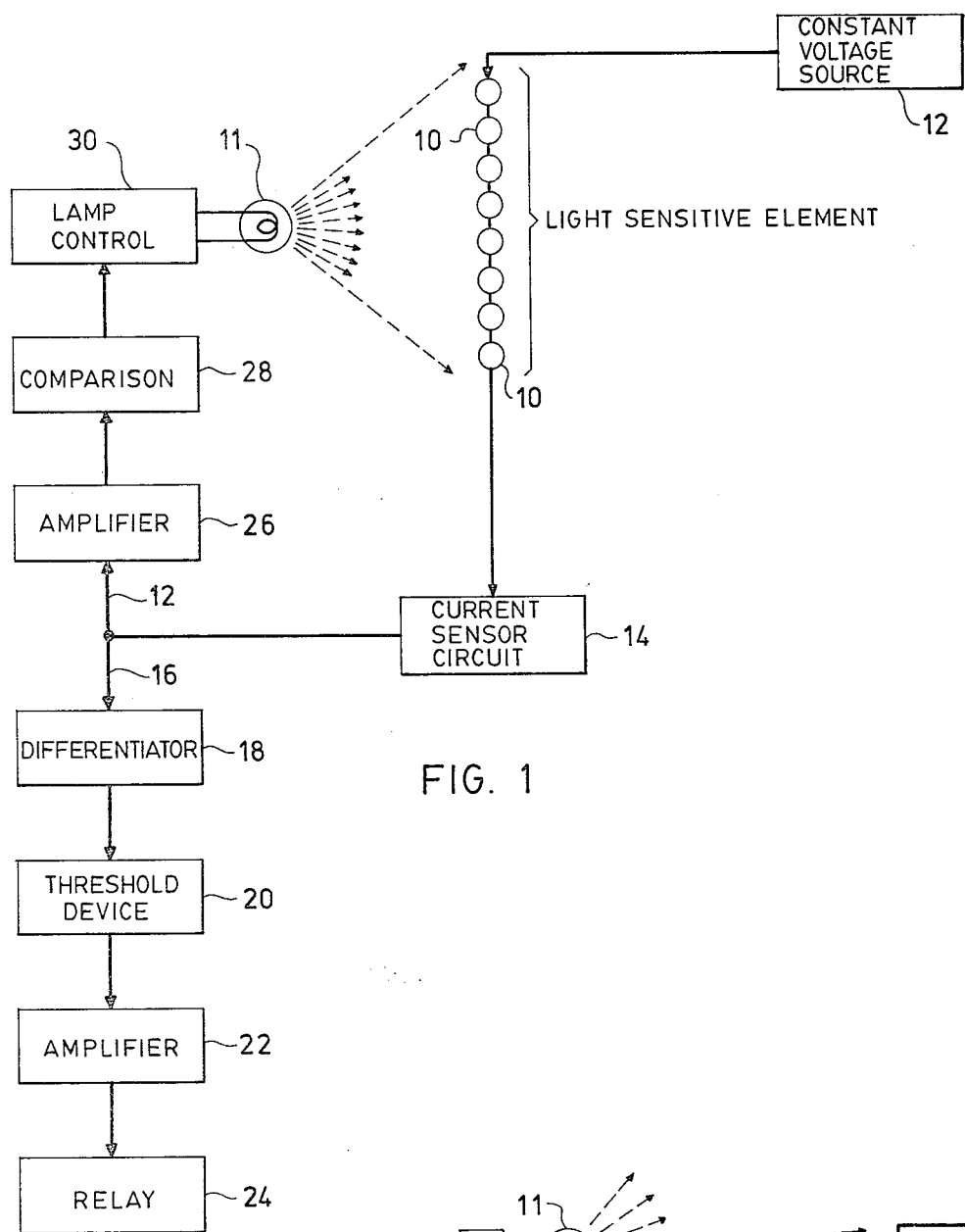

United States Patent [19]

Barnes

[11] 4,260,882
[45] Apr. 7, 1981

[54] LIGHT SENSITIVE DETECTION CIRCUIT

[76] Inventor: Austen B. Barnes, 337 Sheppard Ave. E. Pickering, Toronto, Canada, L1V 1E6

[21] Appl. No.: 907,173

[22] Filed: May 17, 1978

[51] Int. Cl.³ .............................................. G01J 1/32
[52] U.S. Cl. .............................. 250/205; 250/214 RC; 250/221
[58] Field of Search ......... 250/205, 221, 222, 214 RC

[56] References Cited
U.S. PATENT DOCUMENTS

| | | | |
|---|---|---|---|
| 3,066,226 | 11/1962 | Lindstrom | 250/222 |
| 3,473,037 | 10/1969 | Schmermund | 250/222 X |
| 3,517,167 | 6/1970 | Bell | 250/205 |
| 3,612,884 | 10/1971 | Linardos et al. | 250/222 X |
| 3,742,222 | 6/1973 | Endl | 250/221 X |
| 3,858,043 | 12/1974 | Sick et al. | 250/221 |
| 3,946,224 | 3/1976 | Allera et al. | 250/221 |
| 4,032,777 | 6/1977 | McCaleb | 250/221 X |

Primary Examiner—David C. Nelms
Assistant Examiner—Darwin R. Hostetter

[57] ABSTRACT

Detection circuit for objects has a light source located to illuminate a plurality of light sensitive electrical elements. The light sensitive elements are of the type to alter their electrical characteristics when illuminated and are connected in series in an electrical circuit. Means are provided for detecting the rate of change of one of the current flow through or the voltage across the series circuit and for producing an output varying as said rate of change.

1 Claim, 2 Drawing Figures

LIGHT SENSITIVE DETECTION CIRCUIT

This invention relates to means for detecting the presence of a solid object at a predetermined locality where the detection is achieved by the interruption of a beam of light to a light sensitive electrical element.

By "light sensitive electrical element" is meant a device whose impedance, resistance or other electrical characteristic is determined by the intensity of light falling thereon, whereby the interruption by an object of light falling on such light sensitive electrical element may be detected by a cheque in the electrical characteristics of the element.

The invention provides a light source whose radiation preferably proceeds from a small area, although the area is finite, and corresponding thereto there is provided a line of light sensitive elements arranged to receive radiation from the corresponding source. Commonest types of light sensitive electrical elements are photo diodes, photo cells and photo transistors. The light sensitive elements are usually arranged as closely together as required to avoid non detection or dead areas therebetween. The light sensitive elements are electrically connected in series with a relatively constant voltage source whereby a detection of current through or voltage across the elements may be made. Detection is made of the rate of change of a characteristic, i.e., either the voltage across, or the current through, the series connected light sensitive elements. A rapid change of an electrical characteristic of an element being measured is detected as an indication that the light beam has been interrupted by a foreign object. Detection of a slower change of the electrical characteristic of such elements being measured is not used as an indication of a foreign object but is used to adjust the intensity of the illuminating source in a sense to reduce the deviation of such characteristic from the expected value when not interrupted by a foreign object. By this correction to the intensity of the light source, compensation is made for such factors as: change in ambient light, change of source characteristics, or change in the power source or circuitry involving the electrical elements. The light source which it is preferred to use is incandescent. However, within the scope of the invention, the light source may be fluorescent, a light emitting diode, or other form of controllable light emitting source. The control of the intensity of such sources may be by control of the actual light intensity or by control of the on-off duration of the light such as by the use of pulse or pulse width modulation.

The devices constructed in accord with the invention may be constructed for many industrial uses. It may be used (for example): to detect the ejection of parts from a machine or to detect the interjection of machine parts, human operators or another foreign object into a prescribed area or zone.

Figure 2:
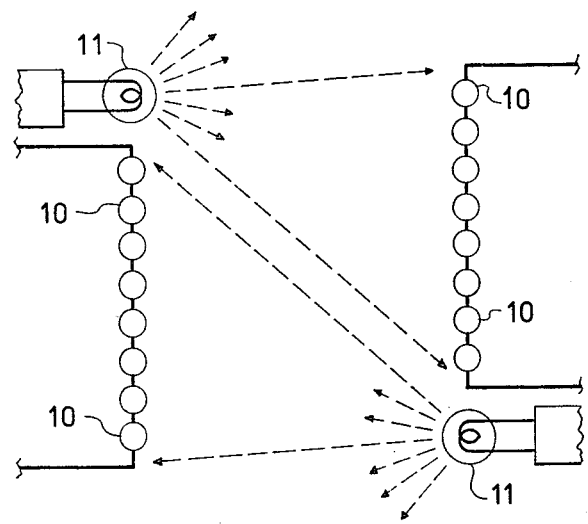

In drawings which illustrate a preferred embodiment of the invention:

FIG. 1 shows a schematic of the circuit for a combination of a light source and a series of light sensitive elements; and FIG. 2 shows a pair of combinations arranged to provide a rectangular detection area.

The drawing shows schematic connections between the functional elements shown rather than the full details of the wiring which will be obvious to anyone skilled in the art.

The drawings show a line of light sensitive elements 10 such as photo electric cells preferably arranged physically in a straight line and electrically connected in series. The elements 10 are arranged and oriented to receive light from an incandescent light source 11. The intensity of light source 11 is controlled by lamp control 30. This series connected circuit of elements 10 could equally well employ photo diodes or photo transistors, in each case connected in a manner well known to those skilled in the art to produce across the series circuit a voltage or current varying as the intensity of light incident thereon. Any light sensitive electrical element may be used which has the characteristic that in response to variation of the intensity of light falling thereon, the element evidences a change in the voltage or impedance thereacross or in the current passing therethrough.

The photo cells 10 of the drawing are arranged to be connected in series with a constant voltage source 12 in such a way that current through the cells varies as the impedance therein. It will be realised that, although such a source 12 is designed to provide constant voltage, that the potential at the source output does vary from time to time due to changes in parameters associated therewith and in the accompanying circuit. Similarly, the current resulting therefrom will vary slowly even at times when there is no interference with the light falling on the cells. The current through the series connected photocells 10 is measured, in any manner well known to those skilled in the art, in the equipment represented by the block called "Current Sensor Circuit" 14. The output of the current sensor circuit 14 provides a signal varying as the current sensed. The signal is, in the preferred embodiment, used for two purposes.

In line 16 the signal is differentiated at the differentiator 18. The output of the differentiator 18 is compared at threshold device 20 with a predetermined level for such output. If the output of differentiator 18 is above a predetermined value, the threshold device 20 sends a signal through the amplifier 22 of a magnitude to operate the relay 24. If the output of differentiator 18 is below such predetermined amount, no signal is sent from the threshold device to the relay. The quantum of the differentiator output is determined by the rate of change of the current sensed at device 14.

Operation of the relay 24 will cause the occurrence of other operations depending upon the purpose of the detection mechanism. If the detection is of human or foreign objects approaching a prescribed zone relative to a piece of machinery, the relay will operate to shut off the machinery. If the detection is to count parts being processed down a line the relay will operate a counter, and so on.

The circuit controlling relay 24 thus operates on the rate of change of impedance in the photo cells circuit and the output of threshold device 20 actuates the relay 24 responsive to rapid changes of current through photocells 10 caused by interrupting the bean light but is not actuated by slow changes to the current flow through photocells 10 caused by gradual changes in light intensity, source voltage, or circuit parameters. Such slow changes, do not cause operation of relay 24 but are compensated for by connection 12 carrying a signal proportional to the current through photocells 10 (preferably through an amplifier 26) to a comparison circuit 28 for comparison with a measure of the desired value for current through the photocells. The result of the comparison at circuit 28 is to provide a signal to the lamp control 30 to cause it to vary the lamp intensity in a sense to reduce the difference between the actual value of the current through the elements and the current value desired. Such controls thus automatically compensate for changes in the potential of voltage source 12, ambient light intensity (since ambient light is also incident upon the photocells) and light intensity of light source.

The definition and discrimination of the device is improved by providing that the source 11 is as small as possible consistent with providing the required illumination for the photocells. As previously noted, the source may be fluorescent or a light emitting diode and may have its intensity directly-directly controlled or controlled by the use of techniques such as pulse width modulation.

FIG. 2 shows two of the light source-photocell chain combinations, arranged, in a preferred arrangement, to provide for detection of the entry of objects over a rectangular area. In each case the source 11 is located on the perpendicular from one end of a straight line of photocells 10 on which it radiates. Thus two right angled triangle areas are defined by two such combinations which may be combined to form a rectangle as shown. Each combination may operate separate circuits such as that shown in FIG. 1.

In the circuitry of FIG. 1 separate signals, which are a function of the current through the cells, may be used for the rate and for the absolute control functions. Moreover, instead of sensing current change and value, similar characteristics of voltage or impedance across the cells 10 may be sensed. Thus for example; instead of the current sensor 14 connected in series with the light sensitive elements 10; rather, the circuit for the light sensitive elements may be otherwise completed and a voltage measuring device placed in parallel with the series of elements 10 to measure changes of voltage thereacross. Such voltage measuring means would then provide a signal to a differentiator such as 18 and a signal to the lamp control.

I claim:

1. Means for the detection of objects, said means comprising:
    a light source,
    a plurality of light sensitive electrical elements arranged to receive light from said source,
    said light sensitive elements being connected in a series connection in an electrical circuit,
    means connected to said series connection for producing a first signal varying as the impedance across said series connection,
    means responsive to said first signal for causing alteration in the energization of said light source in a sense to reduce the difference between the value of said first signal and a predetermined desired value therefor,
    means for detecting the rate of change in impedance across said series connection and for producing a second signal varying with said rate of change,
    means responsive to a value of said second signal corresponding to a rate of change above a predetermined value for producing a control signal.

* * * * *